US009274621B2

(12) United States Patent
Deng et al.

(10) Patent No.: US 9,274,621 B2
(45) Date of Patent: Mar. 1, 2016

(54) APPARATUS INCLUDING A SENSOR ARRANGEMENT AND METHODS OF OPERATING THE SAME

(75) Inventors: Zhicheng Deng, Beijing (CN); Liangfeng Xu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 860 days.

(21) Appl. No.: 13/260,552

(22) PCT Filed: Mar. 26, 2009

(86) PCT No.: PCT/CN2009/000319
§ 371 (c)(1),
(2), (4) Date: Sep. 26, 2011

(87) PCT Pub. No.: WO2010/108300
PCT Pub. Date: Sep. 30, 2010

(65) Prior Publication Data
US 2012/0026196 A1    Feb. 2, 2012

(51) Int. Cl.
*G06F 3/0488* (2013.01)
*G06F 3/0481* (2013.01)
(Continued)

(52) U.S. Cl.
CPC .............. *G06F 3/0362* (2013.01); *G06F 3/033* (2013.01); *G06F 3/04815* (2013.01); *G06F 2203/0339* (2013.01)

(58) Field of Classification Search
CPC .......... G06F 3/0488; G06F 2200/1614; G06F 2203/04105; G09G 2340/0492
USPC ......................................... 345/173–177, 649
See application file for complete search history.

(56) References Cited

U.S. PATENT DOCUMENTS

| 4,017,858 A | 4/1977 | Kuipers |
| 6,597,347 B1 * | 7/2003 | Yasutake ....................... 345/173 |

(Continued)

FOREIGN PATENT DOCUMENTS

| CN | 1969254 A | 5/2007 |
| JP | 2007-305097 A | 11/2007 |
| WO | 2008/138046 A1 | 11/2008 |

OTHER PUBLICATIONS

International Search Report and Written Opinion received for corresponding Patent Cooperation Treaty Application No. PCT/CN2009/000319, dated Jan. 7, 2010, 10 pages.

(Continued)

*Primary Examiner* — Matthew D Salvucci
(74) *Attorney, Agent, or Firm* — Harrington & Smith

(57) ABSTRACT

An apparatus is provided, which comprises: a display configured to display an image, a sensor arrangement (100), and a processing arrangement, wherein the sensor arrangement comprises first, second and third linear sensor arrays (102, 104,106), each of the linear sensor arrays being disposed generally orthogonal to each of the other linear sensor arrays and converging with each of the other linear sensor arrays at or near one end thereof, and wherein the processing arrangement is configured, in response to determining that two consecutive inputs are on different ones of the first and second linear sensor arrays, to rotate the image displayed on the display about a first axis, in response to determining that two consecutive inputs are on different ones of the second and third sensor arrays, to rotate the image displayed on the display about a second axis, the second axis being substantially perpendicular to the first axis, and in response to determining that two consecutive inputs are on different ones of the first and third linear sensor arrays, to rotate the image displayed on the display about a third axis, the third axis being substantially perpendicular to both the first and second axes.

16 Claims, 11 Drawing Sheets

(51) Int. Cl.
*G06F 3/0362* (2013.01)
*G06F 3/033* (2013.01)

(56) References Cited

U.S. PATENT DOCUMENTS

| | | |
|---|---|---|
| 2002/0158838 A1 | 10/2002 | Smith et al. |
| 2006/0197750 A1 | 9/2006 | Kerr et al. |
| 2006/0238517 A1 | 10/2006 | King et al. |
| 2007/0252821 A1 | 11/2007 | Hollemans et al. |
| 2008/0042973 A1* | 2/2008 | Zhao et al. .................. 345/156 |
| 2008/0159088 A1* | 7/2008 | Simmons et al. .......... 369/44.14 |
| 2008/0198357 A1* | 8/2008 | Cheng et al. .................. 356/28 |
| 2008/0284738 A1 | 11/2008 | Hovden et al. |
| 2009/0058819 A1 | 3/2009 | Gioscia |

OTHER PUBLICATIONS

Office action received for corresponding Chinese Patent Application No. 200980159021.5, dated Nov. 5, 2013, 6 pages of office action and 3 pages of office action translation.

Office action received for corresponding Korean Patent Application No. 2011-7025290, dated May 16, 2013, 3 pages, No English Language Translation available.

* cited by examiner

APPARATUS INCLUDING A SENSOR ARRANGEMENT AND METHODS OF OPERATING THE SAME

RELATED APPLICATION

This application was originally filed as PCT Application No. PCT/CN2009/000319 on Mar. 26, 2009, which is incorporated herein by reference in its entirety.

FIELD

This specification relates to the field of sensor arrangements.

BACKGROUND

There are many different types of input device for electronic devices. These include keyboards, keypads, touch pads, touch sensitive displays, trackwheels and trackballs.

SUMMARY

According to a first aspect, this specification provides an apparatus comprising a sensor arrangement, and a processing arrangement, wherein the sensor arrangement comprises first, second and third linear sensor arrays, each of the linear sensor arrays being disposed generally orthogonal to each of the other linear sensor arrays and converging with each of the other linear sensor arrays at or near one end thereof, and wherein the processing arrangement is configured, in response to determining that two consecutive inputs are on different ones of the first and second linear sensor arrays, to provide a first output, in response to determining that two consecutive inputs are on different ones of the second and third sensor arrays, to provide a second output, and in response to determining that two consecutive inputs are on different ones of the first and third linear sensor arrays, to provide a third output.

According to a second aspect, this specification provides a method comprising detecting inputs on a sensor arrangement, the sensor arrangement comprising first, second and third linear sensor arrays, each of the linear sensor arrays being disposed generally orthogonal to each of the other linear sensor arrays and converging with each of the other linear sensor arrays at or near one end thereof, in response to determining that two consecutive inputs are on different ones of the first and second linear sensor arrays, providing a first output, in response to determining that two consecutive inputs are on different ones of the second and third sensor arrays, providing a second output and, in response to determining that two consecutive inputs are on different ones of the first and third linear sensor arrays, providing a third output.

According to a third aspect, this specification provides an apparatus comprising a display configured to display an image, a sensor arrangement, and a processing arrangement, wherein the sensor arrangement comprises first, second and third linear sensor arrays, each of the linear sensor arrays being disposed generally orthogonal to each of the other linear sensor arrays and converging with each of the other linear sensor arrays at or near one end thereof, and wherein the processing arrangement is configured, in response to determining that two consecutive inputs are on different ones of the first and second linear sensor arrays, to rotate the image displayed on the display about a first axis, in response to determining that two consecutive inputs are on different ones of the second and third sensor arrays, to rotate the image displayed on the display about a second axis, the second axis being substantially perpendicular to the first axis, and in response to determining that two consecutive inputs are on different ones of the first and third linear sensor arrays, to rotate the image displayed on the display about a third axis, the third axis being substantially perpendicular to both the first and second axes.

According to a fourth aspect, this specification provides a method comprising displaying an image on a display, detecting inputs on a sensor arrangement, the sensor arrangement comprising first, second and third linear sensor arrays, each of the linear sensor arrays being disposed generally orthogonal to each of the other linear sensor arrays and converging with each of the other linear sensor arrays at or near one end thereof, in response to determining that two consecutive inputs are on different ones of the first and second linear sensor arrays, rotating the image displayed on the display about a first axis, in response to determining that two consecutive inputs are on different ones of the second and third sensor arrays, rotating the image displayed on the display about a second axis, the second axis being substantially perpendicular to the first axis, and in response to determining that two consecutive inputs are on different ones of the first and third linear sensor arrays, rotating the image displayed on the display about a third axis, the third axis being substantially perpendicular to both the first and second axes.

According to a fifth aspect, this specification provides apparatus comprising means for detecting inputs on a sensor arrangement, the sensor arrangement comprising first, second and third linear sensor arrays, each of the linear sensor arrays being disposed generally orthogonal to each of the other linear sensor arrays and converging with each of the other linear sensor arrays at or near one end thereof, means for providing a first output in response to determining that two consecutive inputs are on different ones of the first and second linear sensor arrays, means for providing a second output in response to determining that two consecutive inputs are on different ones of the second and third sensor arrays, and means for providing a third output in response to determining that two consecutive inputs are on different ones of the first and third linear sensor arrays.

According to a sixth aspect, this specification provides apparatus comprising means for displaying an image, means for detecting inputs on a sensor arrangement, the sensor arrangement comprising first, second and third linear sensor arrays, each of the linear sensor arrays being disposed generally orthogonal to each of the other linear sensor arrays and converging with each of the other linear sensor arrays at or near one end thereof, means for rotating an image displayed by the display means about a first axis in response to determining that two consecutive inputs are on different ones of the first and second linear sensor arrays, means for rotating an image displayed by the display means about a second axis in response to determining that two consecutive inputs are on different ones of the second and third sensor arrays, the second axis being substantially perpendicular to the first axis, and means for rotating an image displayed by the display means about a third axis in response to determining that two consecutive inputs are on different ones of the first and third linear sensor arrays, the third axis being substantially perpendicular to both the first and second axes.

DETAILED DESCRIPTION OF VARIOUS EMBODIMENTS OF THE INVENTION

Figure 1:
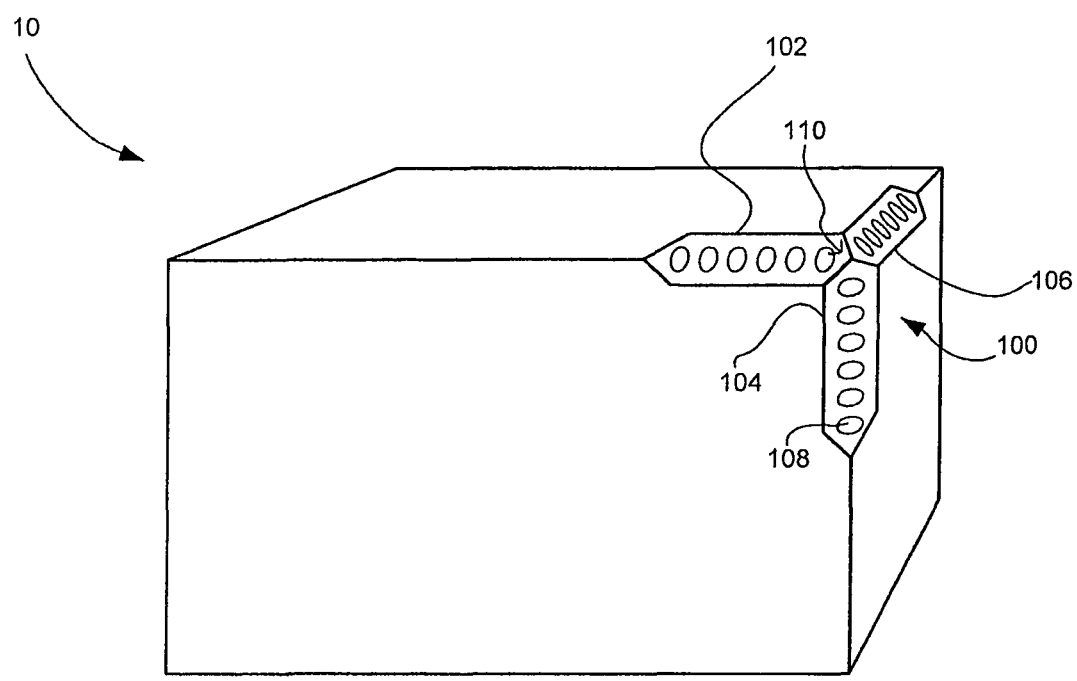
FIG. 1 is a schematic view of an example of a sensor arrangement of an input device for an electronic device.

FIG. 1 is a schematic view of an example of a sensor arrangement 100 of an input device 10 for an electronic device (not shown). The sensor arrangement 100 comprises three linear sensor arrays: a first linear sensor array 102; a second linear sensor array 104; and a third linear sensor array 106. Each of the first, second and third linear sensor arrays 102, 104, 106 comprises a plurality of linearly arranged sensors 108. In the exemplary embodiment of FIG. 1, each of the linear sensor arrays 102, 104, 106 comprises six sensors 108 arranged in a one-dimensional, in this case a 6×1, array.

It will be understood, however, that the linear sensor arrays 102, 104, 106 may contain more or fewer than six sensors 108. Each of the sensors 108 of the linear sensor arrays 102, 104, 106 alternatively may be arranged in a two-dimensional array, for example an 8×2 array. Each of the linear sensor arrays alternatively may comprise a continuous linear sensor array instead of a plurality of discrete sensors.

The sensors 108 may comprise capacitive touch sensors, resistive touch sensors, acoustic touch sensors, optical touch sensors or any other type of sensor suitable for detecting an input on or near an exterior surface of the linear sensor arrays 102, 104, 106. The sensors 108 may be touch sensitive sensors. Alternatively the sensors 108 may detect proximity and not require contact in order to establish that an input has been provided by a user. The linear sensor arrays 102, 104, 106 of the sensor arrangement 100 are configured to detect an input or inputs on or near an exterior surface of the linear sensor arrays 102. The input may be due to the presence of a finger, a stylus or any other suitable device input technique.

The linear sensor arrays 102, 104, 106 of the sensor arrangement are disposed substantially orthogonal to each other. Each of the linear sensor arrays 102, 104, 106 is disposed so as to converge at a convergence end with a convergence end o each of the other two linear sensor arrays 102, 104, 106. The linear sensor arrays 102, 104, 106 converge at a convergence region 110. The ends of the linear sensor arrays 102, 104, 106 that are opposite the convergence ends 110 are referred to in the following as outer ends.

In FIG. 1, the example input device 10 has the shape of a generally rectangular cuboid. Each of the linear sensor arrays 102, 104, 106 is disposed on an edge of the input device 10. The convergence region 110 is located substantially at a vertex of the input device 10. It will be appreciated that the input device alternatively may have another shape, for example, cubic, or a curved shape to suit a particular three-dimensional profile of an electronic device (not shown).

Using the sensor arrangement 100 of FIG. 1, a user is able easily to provide a number of different gesture types to the input device using just a single hand. Examples of the various different gesture types are shown on FIGS. 2A to 2G. The touch inputs to the linear sensor arrays 102, 104, 106 are represented by arrows.

Figure 2A:
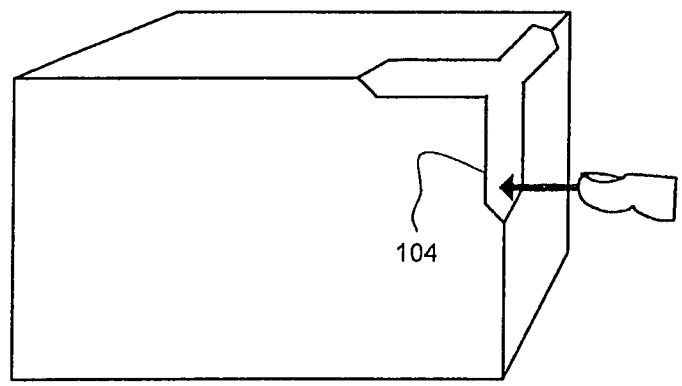
FIGS. 2A to 2G show a plurality of different gesture types that may provided to the input device of FIG. 1.

FIG. 2A shows the provision of a first gesture type. To provide the first gesture type a user applies a single non-dynamic touch input to one of the linear sensor arrays 102, 104, 106, in this example the second linear sensor array 104. A non-dynamic touch input is a touch input that does not move along the surface of the linear sensor array to which it is applied. In other words it is a touch input that applied to only one location on the sensor arrangement 100. The first gesture type can be provided to the sensor arrangement in three different ways. These are: a non-dynamic touch input to the first linear sensor array 102; a non-dynamic touch input to the second linear sensor array 104; and a non-dynamic touch input to the third linear sensor array 106.

Figure 2B:
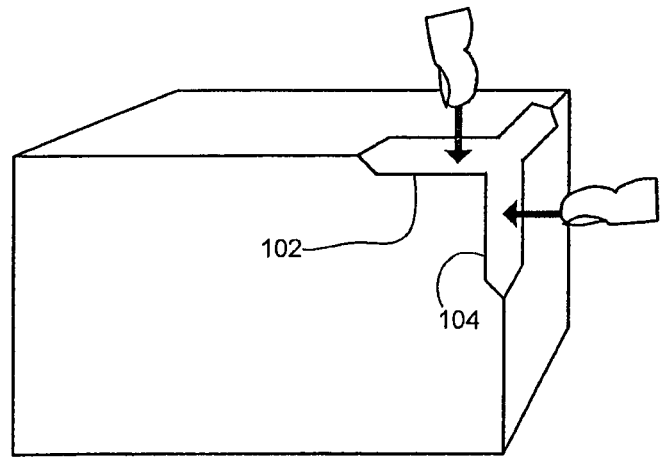

FIG. 2B shows the provision of a second gesture type. To provide the second gesture type a user applies a non-dynamic touch input to two of the linear sensor arrays 102, 104, 106 simultaneously, in this case the first and second linear sensor arrays 102, 104. The second gesture type can be applied to the sensor arrangement 100 in three different ways. These are: simultaneous non-dynamic touch inputs to the first and second linear sensor arrays 102, 104; simultaneous non-dynamic touch inputs to the second and third linear sensor arrays 104, 106; and simultaneous non-dynamic touch inputs to the first and third linear sensor arrays 102, 106.

Figure 2C:
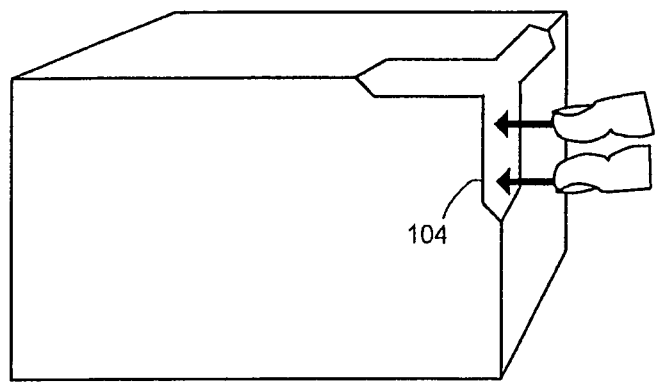

FIG. 2C shows the provision of a third gesture type. To provide the third gesture type a user applies two simultaneous non-dynamic touch inputs to one of the linear sensor arrays 102, 104, 106, in this case the second linear sensor array 104. The third gesture type can be provided to the sensor arrangement 100 in three different ways. These are: two simultaneous non-dynamic touch inputs to the first sensor array 102; two simultaneous non-dynamic touch inputs to the second linear sensor array 104; and two simultaneous non-dynamic touch inputs to the third linear sensor array 106.

Figure 2D:
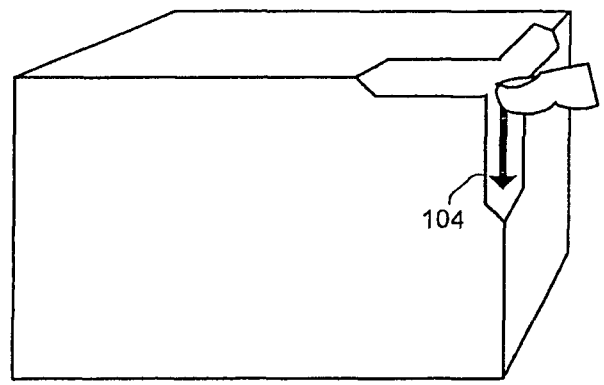

FIG. 2D shows the provision of a fourth gesture type. The fourth gesture type is provided by a user applying a dynamic input to one of the linear sensor arrays 102, 104, 106. A dynamic input is where the touch input is moved, or slid, in one movement along the surface of the sensor arrangement 100. The fourth gesture type can be provided to the sensor arrangement 100 in six different ways. These are: a dynamic input applied to the first linear sensor array 102 in a direction from the outer end towards the convergence end; a dynamic input applied to the first linear sensor array 102 in a direction from the convergence end towards the outer end; a dynamic input applied to the second linear sensor array 104 in a direction from the outer end towards the convergence end; a dynamic input applied to the second linear sensor array 104 in a direction from the convergence end towards the outer end; a dynamic input to the third linear sensor array 106 in a direction from the outer end towards the convergence end; and a dynamic input to the third linear sensor array 106 in a direction from the convergence end towards the outer end.

Figure 2E:
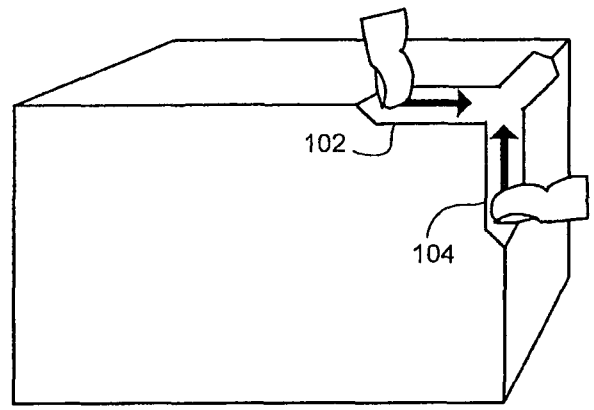

FIG. 2E shows the provision of a fifth gesture type. The fifth gesture type is provided by a user applying a dynamic input to two of the linear sensor arrays 102, 104, 106 simultaneously. The user may provide this input, for example, by sliding two fingers (or a finger and a thumb) from the outer ends of two of the linear sensor arrays 102, 104, 106 towards the sensor convergence region 110. By providing the gesture to different combinations of linear sensor arrays 102, 104, 106 and/or with different combinations directions of movement of the dynamic inputs, there are twelve ways in which a gesture of the fifth gesture type can be provided to the sensor arrangement 100.

Figure 2F:
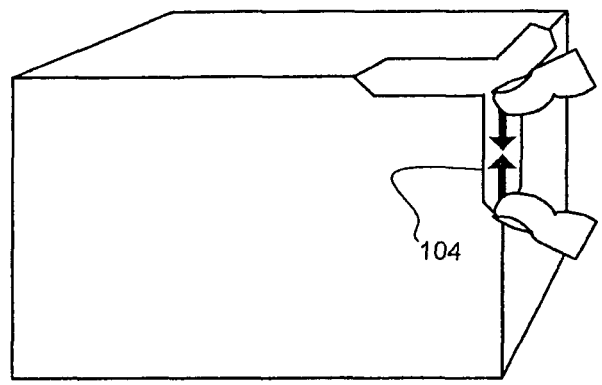

FIG. 2F shows the provision of a sixth gesture type. To provide the sixth gesture type, a user applies two simultaneous dynamic touch inputs to one of the linear sensor arrays 102, 104, 106. The user may provide this gesture type, for example, by executing a pinching motion using a finger and thumb on one of the linear sensor arrays 102, 104, 106. By virtue of there being three linear sensor arrays 102, 104, 106 and two different possible directions of movement of the dynamic inputs, there are six ways in which the sixth gesture type can be provided to the sensor arrangement.

Figure 2G:
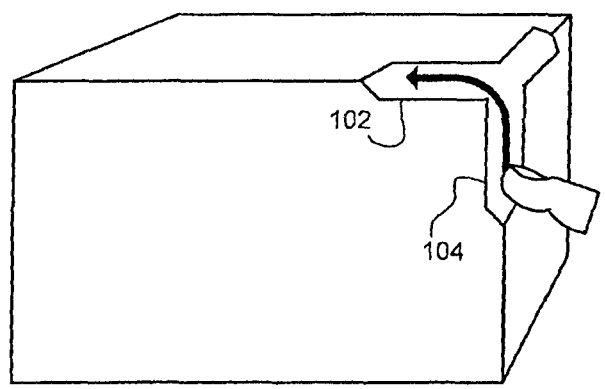

FIG. 2G shows the provision of a seventh gesture type. The seventh gesture type is provided by a user applying a dynamic input that moves from one linear sensor array 102, 104, 106 to another. Because each of the linear sensor arrays 102, 104, 106 converge at the sensor convergence region 110, the seventh gesture type can be provided in a single motion of the user's finger (or stylus). For example, in FIG. 2G, the user's fingers starts at the outer end of the second linear sensor array 104, is moved along the second linear sensor array 104, passes over the sensor convergence region 110, passes along the first linear sensor array 102, and finishes near the outer end of the first linear sensor array 102.

There are six different ways in which the seventh gesture type can be applied to the sensor arrangement 100. These are: a dynamic touch input moving from the first to the second linear sensor array; a dynamic touch input moving from the second to the first linear sensor array; a dynamic touch input moving from the second to the third linear sensor array; a dynamic touch input moving from the third to the second linear sensor array; a dynamic touch input moving from the first to the third linear sensor array; and a dynamic touch input moving from the third to the first linear sensor array.

It will be appreciated that other gesture types may also be applied to the sensor arrangement using a single hand. For example, three touch inputs, dynamic, non-dynamic or a combination of both, may be applied simultaneously to the three linear sensor arrays 102, 104, 106.

Each of the different ways of providing a particular gesture type to the sensor arrangement 100 may be termed a gesture sub-type. Each gesture sub-type results in a different command being provided at an output. Some, or all, gesture sub-types may cause an application to which the input device 10 provides outputs to be controlled in a different way. The ways in which the application is controlled depends on the specific nature of the application. The application may be a software program executed by a processor.

Figure 3:
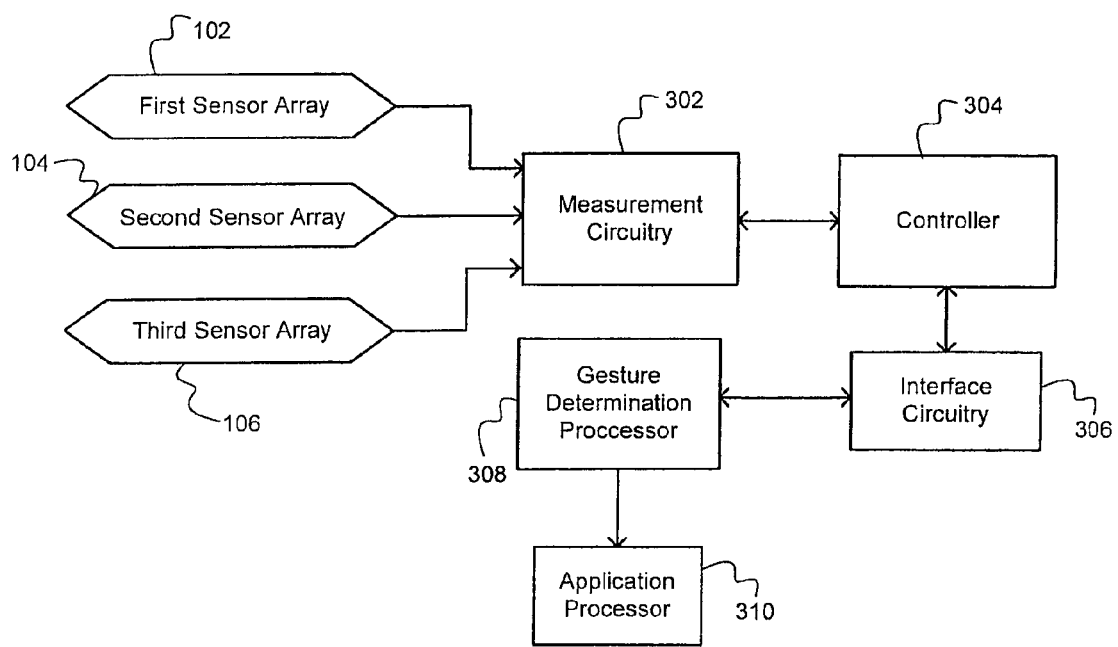
FIG. 3 is a schematic of an example of a processing arrangement for determining the type of a gesture applied to the input device of FIG. 1.

FIG. 3 is a schematic of an example of a processing arrangement 300 in communication with the sensor arrangement 100 of FIG. 1.

In FIG. 3, each of the linear sensor arrays 102, 104, 106 is in communication with measurement circuitry 302. The measurement circuitry 302 is configured to measure outputs of the linear sensor arrays 102, 104, 106. The provision of a touch input on or near to a particular sensor 108 of a linear sensor array causes the output from that sensor to change. The outputs from the linear sensor arrays, and the way in which they change as a result of an applied touch input or touch inputs, depend on the type of sensors 108 that constitute the linear sensor arrays 102, 104, 106.

The measurement circuitry 302 passes the measured outputs of the linear sensor arrays 102, 104, 106 to a controller 304. The controller is configured to use the measured outputs of the linear sensor arrays 102, 104, 106 to determine location information. The location information specifies a location or locations on the linear sensor arrays 102, 104, 106 at which touch inputs are being applied at a particular time.

The location information is passed, as a location information signal, from the controller 304, via an interface circuit 306, to a gesture determination processor 308. The gesture determination processor may comprise gesture determination software executed on a processor. The interface circuit 306 may be, for example, an I2C, a UART or an SPI interface. The location information signals may be sent from the controller 304 to the gesture determination processor 308 at regular intervals. In alternative embodiments, the location information signal may be a continuous signal, indicating the location or locations of touch inputs.

The gesture determination processor 308 is configured to interpret received location information signals from the interface circuitry, and to determine therefrom the type and sub-type of the gesture being applied to the sensor arrangement 100. Following these determinations, the gesture determination processor 308 may send a command or control signal, indicating the gesture type and sub-type to an application processor 310 on which application software is running and to which the input device 10 is connected. The command or control signal may also indicate other parameters of the gesture. Other parameters may include speed of movement of a dynamic gesture, length of travel of components of a dynamic gesture, duration of a non-dynamic gesture etc.

Location information signals may not be sent to the gesture determination processor 308 when no touch inputs are being applied to the sensor arrangements. Alternatively, a location information signal that indicates no location may be sent.

Figure 4A:
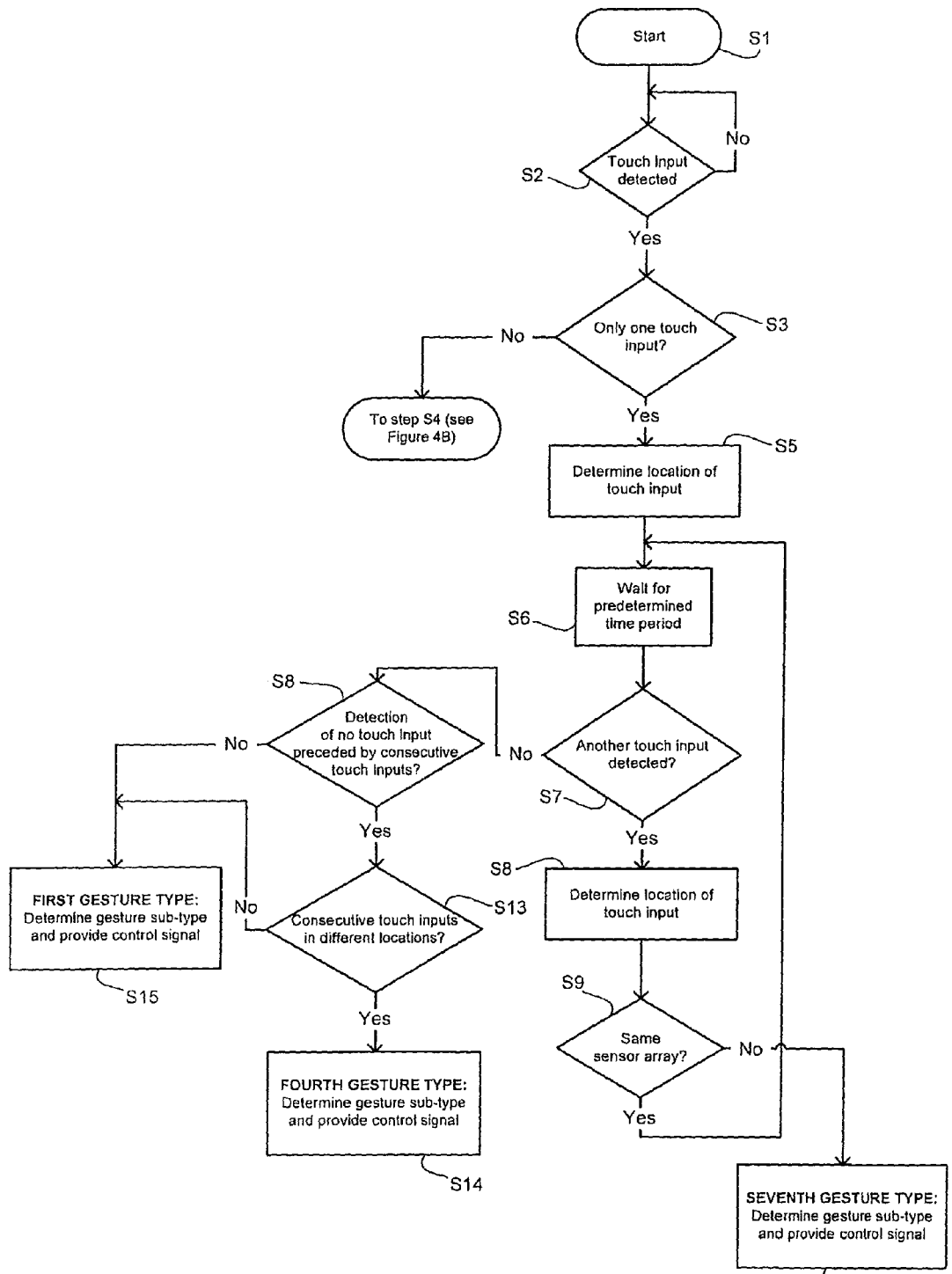
FIGS. 4A and 4B show a flow chart of an example of an operation for determining the type of a gesture applied to the input device of FIG. 1.
Figure 4B:
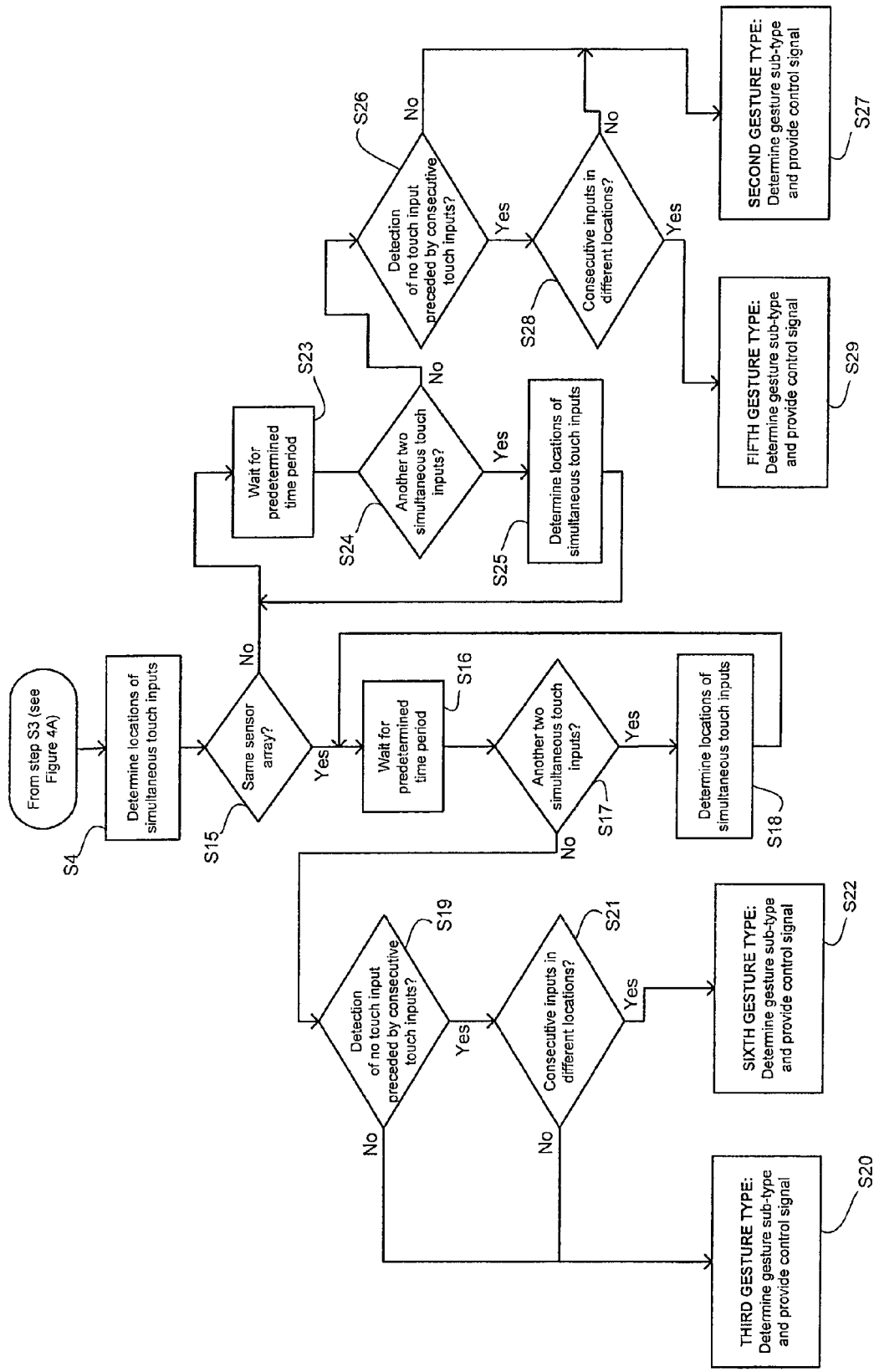

FIGS. 4A and 4B together form FIG. 4, which is a flow chart depicting an example of an operation of the gesture determination processor 308 when determining the gesture type applied to the sensor arrangement 100.

The operation starts in FIG. 4A at step S1. In step S2, the gesture determination processor 308 determines from the location information signals if a touch input is incident on the sensor arrangement 100. If it is determined that a touch input is incident on the sensor arrangement 100, the operation proceeds to step S3. If it is determined that a touch input is not incident, step S2 of the operation is repeated until it is determined that a touch input is incident on the sensor arrangement 100.

In step S3, the gesture determination processor 308 determines from the location information signals if only one touch input is incident on the sensor arrangement 100. If it is determined that more than one touch input is incident, the operation proceeds to step S4, which can be seen on FIG. 4B. Step S4 and the remainder of FIG. 4B will be discussed later in this specification.

If it is determined that only one touch input is incident, the operation proceeds to step S5. In step S5, the gesture determination processor 308 determines, based on the location information signal, the location on the sensor arrangement 100 on which the touch input is incident. This involves determining which one or ones of the sensors 108 experience a user input.

Following step S5, the operation proceeds to step S6. In step S6, the gesture determination processor 308 waits for a predetermined period of time. The predetermined period of time may be, for example, 100 ms. Any other suitable time may be used instead. A suitable time period may be some 10 s of milliseconds, or one or two hundred milliseconds. In embodiments in which the location information signals comprise discrete signals sent at regular intervals, the predetermined time period may correspond to the regular intervals between location information signals.

Following step S6, in step S7, the gesture determination processor 308 determines, based on received location information signals, if another touch input is incident on the sensor arrangement 100. If it is determined that another touch input is incident on the sensor arrangement 100, the operation proceeds to step S8, in which the location of the other incident touch input is determined. A dynamic input results in a sequence of consecutive touch inputs at different locations. A sequence of consecutive touch inputs includes two or more consecutive touch inputs. If no touch input was applied immediately before the start of the sequence of consecutive touch inputs and immediately after the end of the sequence of touch inputs, the sequence may be termed a discrete, or bounded, sequence of consecutive touch inputs.

Touch inputs that are separated in time by the predetermined time period may be termed consecutive touch inputs. Touch inputs that are separated in time by more than the predetermined time period—i.e. where there is a removal of the user input for a period of time—may be termed non-consecutive touch inputs.

Following step S8, in step S9, it is determined if the locations of the consecutive touch inputs are on the same one of the linear sensor arrays 102, 104, 106. If it is determined that consecutive touch inputs were on the same one of the linear sensor arrays 102, 104, 106, the operation returns to step S6. The operation continues to repeat steps S6, S7, S8 and S9 until, in step S7, it is determined that another touch input is not detected.

If it is determined that consecutive touch inputs were incident on different ones of the linear sensor arrays 102, 104, 106, the operation proceeds to step S10.

The gesture determination processor 308 is configured to recognise that consecutive touch inputs that are applied to different ones of the linear sensor arrays 102, 104, 106 constitute part of a provision by a user of the seventh gesture type (for example, a dynamic touch input moving from the second to the first of the linear sensor arrays 102, 104, 106, as in FIG. 2G). In step S10, the gesture determination processor 308 determines the gesture sub-type and transmits a corresponding command or control signal to a connected application. The gesture sub-type may be determined by determining the identities of the two linear sensor arrays 102, 104, 106 to which the consecutive touch inputs were applied, and also by determining which of the identified linear sensor arrays 102, 104, 106 was provided with the first one of the consecutive touch inputs.

If at step S7 it is determined that another touch input is not incident on the sensor arrangement 100, the operation proceeds to step S11. In step S11, it is determined if consecutively detected touch inputs preceded the detection of no touch input. If it is determined that the consecutively detected touch inputs did not precede the detection of no touch input, in other words—if it is determined that only one touch input was detected prior to the detection of no touch input, the operation proceeds to step S12.

The gesture determination processor 308 is configured to recognise that a single touch input followed by no detection of an input constitutes part of a provision by a user of the first gesture type (a non-dynamic touch input to one of the linear sensor arrays 102, 104, 106—see FIG. 2A). In step S12, the gesture determination processor 308 determines which sub-type of the first gesture type has been provided, and transmits a corresponding command or control signal to the connected application. The sub-type of the first gesture type may be determined by identifying the linear sensor array to which the first gesture type was provided, and optionally also the location on that sensor array.

If, in step S11, it is determined that consecutively detected touch inputs did precede the detection of no touch input, the operation proceeds to step S13. In step S13, it is determined whether the detected consecutive touch inputs were incident on the same location. If it is determined that the detected consecutive touch inputs were indeed incident on the same location of the linear sensor array, the operation proceeds to step S12. If it is determined that the detected consecutive touch inputs were not incident on the same location, in other words, that the consecutive touch inputs were incident on different locations of the linear sensor array 102, 104, 106 the operation proceeds to step S14.

The gesture determination processor 308 is configured to recognise that consecutive touch inputs applied to different locations on the same linear sensor array constitutes part of a provision by a user of the fourth gesture type (a dynamic touch input along one of the linear sensor arrays 102, 104, 106—see FIG. 2D). As such, in step S14, the gesture determination processor 308 determines which sub-type of the fourth gesture type has been provided, and transmits a corresponding command or control signal to the connected application. The sub-type of the fourth gesture type may be determined by identifying the linear sensor array to which the gesture was provided and also the direction of movement of the dynamic touch input. The command or control signal may indicate also the speed of the gesture and/or the length of the sensor array covered by the gesture.

Returning now to step S3, if two or more touch inputs are detected simultaneously, the operation proceeds to step S4, which can be seen on FIG. 4B.

In step S4, the locations of the simultaneous touch inputs are determined. Following step S4, in step S15, it is determined whether the two simultaneous touch inputs were incident on the same linear sensor array. If it determined that the two simultaneous touch inputs were incident on the same linear sensor array, the method proceeds to step S16.

In step S16, gesture determination processor 308 waits for a predetermined period of time. The predetermined period of time may be, for example, 100 ms. In embodiments in which the location information signals comprise discrete signals sent at regular intervals, the predetermined time period may correspond to the regular intervals between location information signals.

Following step S16, in step S17, the gesture determination processor 308 determines if another two simultaneous touch inputs are incident on the sensor arrangement 100. If it is determined that another two touch input are incident on the sensor arrangement 100, the operation proceeds to step S18, in which the locations of the incident simultaneous touch inputs are determined.

Following step S18, the operation returns to step S16. The operation continues to repeat steps S16, S17 and S18 until, in step S17, it is determined that another two simultaneous touch inputs are not detected.

Following the determination, in step S17, that another two simultaneous touch inputs are not detected, the operation proceeds to step S19. In step S19, it is determined if the detection of no simultaneous touch inputs was preceded by the detection of consecutive pairs of simultaneous touch inputs. If it is determined that the detection of no simultaneous touch inputs was not preceded by the detection of consecutive pairs of simultaneous touch inputs, in other words, the detection of no simultaneous touch inputs was preceded by only one pair of simultaneous touch inputs, the operation proceeds to step S20.

The gesture determination processor 308 is configured to recognise that a single pair of simultaneous touch inputs applied to the same sensor array constitutes a provision by a user of the third gesture type (a two simultaneous non-dynamic touch inputs applied to one of the linear sensor arrays 102, 104, 106—see FIG. 2C). As such, in step S20, the gesture determination processor 308 determines which sub-type of the third gesture type has been provided, and transmits a corresponding command or control signal to the connected application. The sub-type of the third gesture type may be determined by identifying the linear sensor array to which the touch inputs were provided. The command or control signal may indicate also the locations on the sensor arrays of the touch inputs.

If, in step S19, it is determined that the detection of no simultaneous touch inputs was preceded by the detection of consecutive pairs of simultaneous touch inputs, the operation proceeds to step S21.

In step S21, it is determined if any of the consecutive pairs of simultaneous touch inputs that preceded the detection of no touch input were incident on different locations of the linear sensor array. If it is determined that all pairs of simultaneous touch inputs that preceded the detection of no touch input were incident on the same respective locations of the linear sensor array, the operations proceeds to step S20.

If, in step S21, it is determined that the consecutive pairs of simultaneous touch inputs that preceded the detection of no touch input were incident on different locations of the linear sensor array, in other words that the simultaneous touch inputs were dynamic, the operation proceeds to step S22.

The gesture determination processor 308 is configured to recognise that simultaneous dynamic touch inputs applied to the same sensor array constitutes a provision by a user of the sixth gesture type (see FIG. 2F). As such, in step S22, the gesture determination processor 308 determines which sub-type of the sixth gesture type has been provided, and transmits a corresponding command or control signal to the connected application. The sub-type of the sixth gesture type may be determined by identifying the linear sensor array to which the touch inputs were provided, and the directions of movement of the dynamic touch inputs. The command or control signal may also indicate the speed of movement or either or both of the touch inputs and/or the extent of travel of either or both of the touch inputs.

Returning now to step S15, if it is determined that the two simultaneous touch inputs are incident of different ones of the linear sensor array, the operation proceeds to step S23.

In step S23, the gesture determination processor 308 waits for a predetermined period of time. The predetermined period of time may be, for example, 100 ms. In embodiments in which the location information signals comprise discrete signals sent at regular intervals, the predetermined time period may correspond to the regular intervals between location information signals.

Following step S23, in step S24, the gesture determination processor 308 determines if another two simultaneous touch inputs are incident on the sensor arrangement 100. If it is determined that another two simultaneous touch inputs are incident on the sensor arrangement 100, the operation proceeds to step S25, in which the locations of the incident simultaneous touch inputs are determined.

Following step S25, the operation returns to step S23. The operation continues to repeat steps S23, S24 and S25 until, in step S24, it is determined that another two simultaneous touch inputs are not detected.

Following the determination, in step S24, that another two simultaneous touch inputs are not detected, the operation proceeds to step S26. In step S26, it is determined if the detection of no simultaneous touch inputs was preceded by the detection of consecutive pairs of simultaneous touch inputs. If it is determined that the detection of no simultaneous touch inputs was not preceded by the detection of consecutive pairs of simultaneous touch inputs, in other words, the detection of no simultaneous touch inputs was preceded by only one pair of simultaneous touch inputs, the operation proceeds to step S27.

The gesture determination processor 308 is configured to recognise that a single pair of simultaneous touch inputs applied to the different linear sensor arrays constitutes a provision by a user of the second gesture type (two simultaneous non-dynamic touch inputs applied to different ones of the linear sensor arrays 102, 104, 106 see FIG. 2B). As such, in step S27, the gesture determination processor 308 determines which sub-type of the second gesture type has been provided by the user, and transmits a corresponding command or control signal to the connected application. The sub-type of the second gesture type may be determined by identifying the linear sensor arrays to which the touch inputs were provided. The command or control signal may indicate the locations at which the touch inputs were provided on one or both of the sensor arrays.

If in step S26 it is determined that the detection of no simultaneous touch inputs was preceded by the detection of consecutive pairs of simultaneous touch inputs, the operation proceeds to step S28.

In step S28 it is determined whether any of the consecutive pairs of simultaneous touch inputs, that preceded the detection of no touch input, were incident on different locations of their respective linear sensor arrays. If it is determined that all pairs of simultaneous touch inputs that preceded the detection of no touch input were incident on the same locations of their respective linear sensor array, the operation proceeds to step S27.

If in step S28 it is determined that the consecutive pairs of simultaneous touch inputs that preceded the detection of no touch input were incident on different locations of the linear sensor array, in other words that the simultaneous touch inputs were dynamic, the operation proceeds to step S29.

The gesture determination processor 308 is configured to recognise that simultaneous dynamic touch inputs applied to different sensor arrays constitutes a provision by a user of the fifth gesture type (see FIG. 2E). As such, in step S29, the gesture determination processor 308 determines which sub-type of the fifth gesture type has been provided, and transmits a corresponding command or control signal to the connected application. The sub-type of the fifth gesture type may be determined by identifying the combination of linear sensor arrays to which the touch inputs were provided, and the directions of movement of the dynamic touch inputs. The command or control signal may indicate also the speed of movement of either or both user input and/or the extent of travel of either or both user input.

The input device described above with reference to FIGS. 1 to 4 may constitute a separate device that may be connected, via a suitable physical interface, to another electronic device. As such, the gesture determination processor 308 may transmit signals, via the physical interface, to control an application running on the electronic device.

Alternatively, the hardware arrangement of the input device 10 comprising the sensor arrangement 100, the measurement circuitry 302 and the controller 304 may be located in the input device, and the gesture determination processor 308 may be located in the electronic device which runs the applications.

Figure 5:
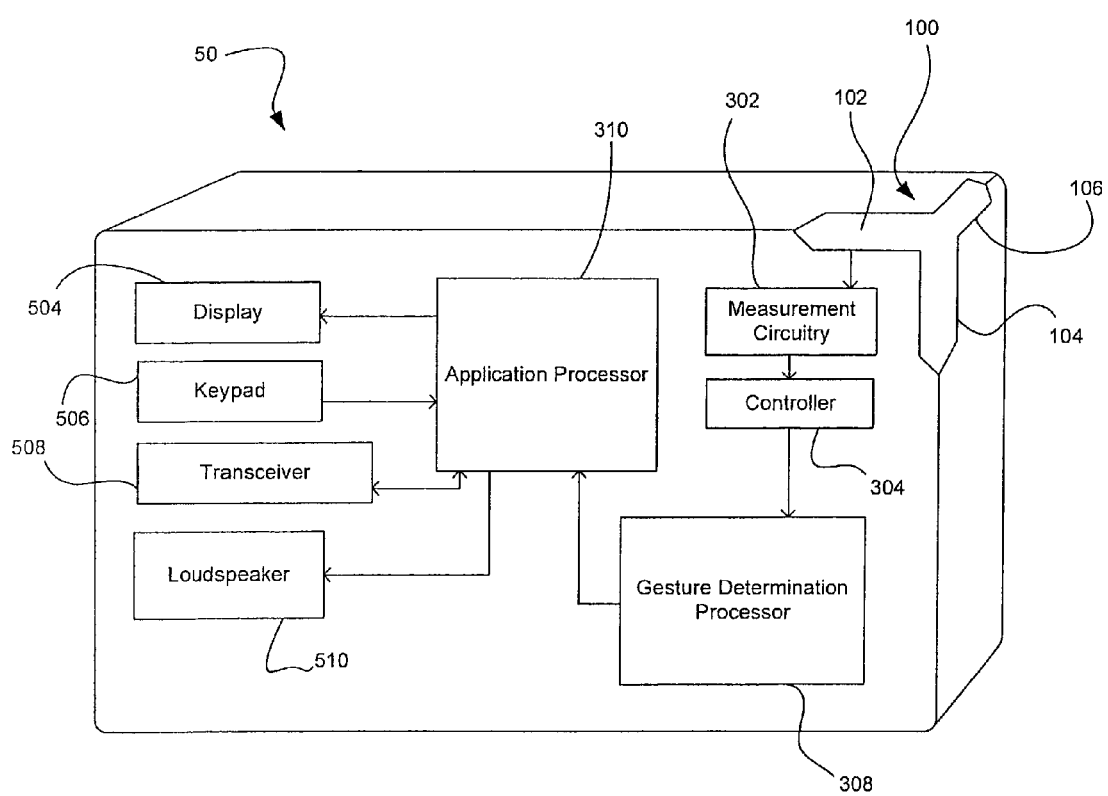
FIG. 5 is a schematic view of an example of a portable electronic device incorporating the input device of FIG. 1.

In other alternative embodiments, the input device is physically integrated with an electronic device. The electronic device may be a portable electronic device such as a mobile telephone, a personal digital assistant, an MP3 player or a navigation device, for instance incorporating a GPS receiver. FIG. 5 is a schematic view of the components of a portable electronic device 50 including the input device 100, 300 described above.

The portable electronic device 50 comprises the sensor arrangement 100, the measurement circuitry 302, the controller 304, the gesture determination processor 308, the application processor 310 for running the application to be controlled via input device, a display 504, a keypad 506, a transceiver 508, a loudspeaker 510. It will be appreciated that the portable electronic device may also include components that are not shown, such as an antenna, a power supply, a microphone etc.

In alternative embodiments, the application processor 310 and the gesture determination processor 308 may be constituted by a single processor.

FIGS. 6A to 6G show an example of the input device 100 being used to control an application being executed on the portable electronic device 50. In this example, the application enables the manipulation of images and objects displayed on the display screen 504.

Figure 6A:
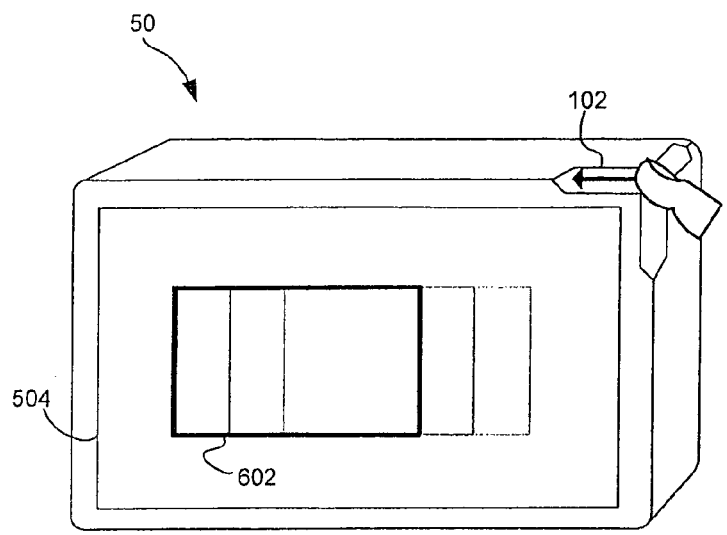
FIGS. 6A to 6G show the input device of FIGS. 1 to 3 being used to control an exemplary application executed by the portable electronic device.

FIG. 6A shows how a dynamic touch input applied to the first linear sensor array 102 (a fourth gesture type) may be used to translate an object 602 displayed on the screen. The direction of translation of the object 602 is the same as the direction of movement of the dynamic input. In FIG. 1 and FIGS. 6A to 6G, the first linear sensor array 102 is disposed horizontally parallel to the width of the display screen. As such, dependent on the direction of movement, a dynamic input applied to the first linear sensor array 102 may be used to translate the object 602 displayed on the screen in either direction parallel to the width of the display screen, i.e. left or right.

Figure 6B:
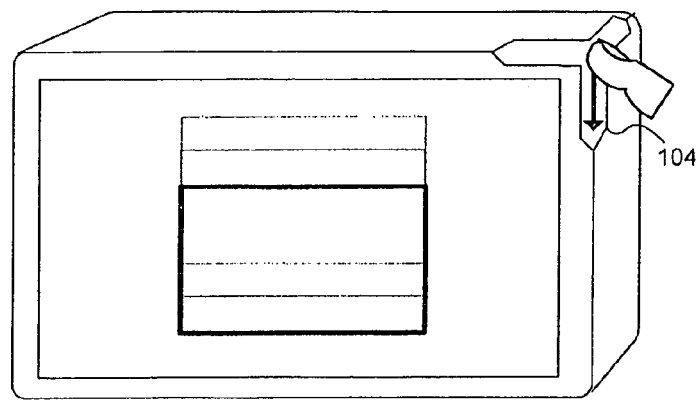

In FIG. 6B, a dynamic touch input is applied to the second linear sensor array 104. In the embodiments described with reference to the figures, the second linear sensor array 104 is disposed vertically, parallel to the height of display screen 504. As such, dependent on the direction of movement, a dynamic input applied to the second linear sensor array 104 may be used to translate the object 602 displayed on the display screen 504 in either direction parallel to the height of the display screen, i.e. up or down. In FIG. 6B, a dynamic touch input being applied in a downwards direction causes the displayed object 602 to be translated also in a downwards direction.

Figure 6C:
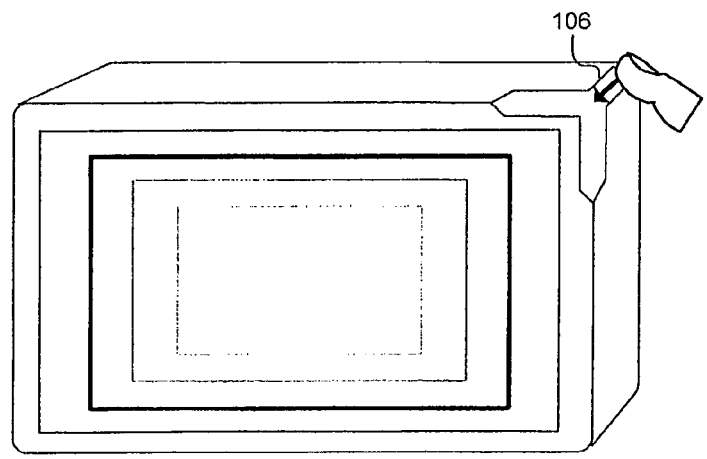

In FIG. 6C, a dynamic touch input is applied to the third linear sensor array 106. In the embodiments described with reference to the figures, the third linear sensor array 106 is disposed horizontally, perpendicular to the surface of the display screen 504. As such, dependent on the direction of movement, a dynamic input applied to the second linear sensor array 104 may be used to make the object 602 appear such that it is moving in either direction perpendicular to the surface of the display screen 504, i.e. backwards or forwards. In FIG. 6B, a dynamic touch input being applied towards the user causes the displayed object also to be moved towards the user. Because the display screen is actually two-dimensional, not three-dimensional, the act of moving the object 602 towards the user may comprise zooming into, or magnifying, the object 602. Conversely, zooming out may involve making the object 602 smaller in size.

Due to the orthogonal relationship between each of the linear sensor arrays 102, 104, 106, when a dynamic touch input moving from a first to a second of the linear sensor arrays 102, 104, 106, (i.e. the seventh gesture type) is applied, the direction of movement of the touch input, in effect, rotates about an axis parallel to the third of the linear sensor arrays 102, 104, 106. According to various embodiments, in response to receiving a command or control signal indicating that a gesture of the seventh type is incident on the sensor arrangement 100, the application rotates the object 602 about an axis parallel to the linear sensor arrays to which the dynamic touch input was not applied. Because the movement of the object on the screen reflects the movement of the user's finger, this can provide the user with an improved user experience. Furthermore, the configuration of the sensor arrangement 100 allows the user to provide inputs to rotate the object both clockwise and anticlockwise in three dimensions.

Figure 6D:
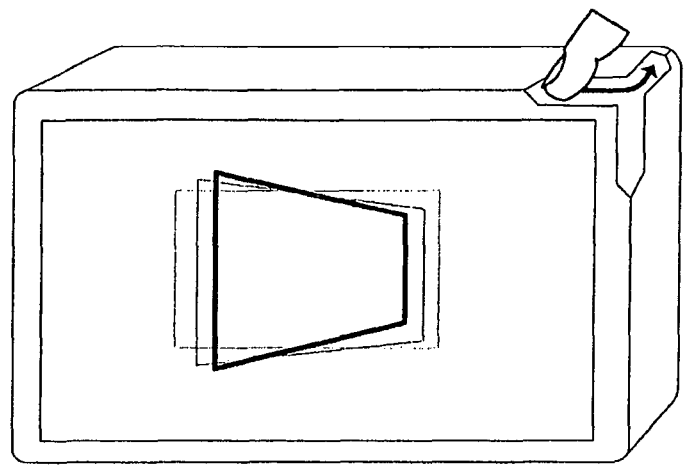

In FIG. 6D, a dynamic touch input moving from the first linear sensor array 102 to the third linear sensor array 106 is applied to the sensor arrangement 100. This causes the object 602 to be rotated anticlockwise about an axis parallel to the longitudinal length second linear sensor array 104, which is parallel to the length of the display screen 504. It will be appreciated that provision of a dynamic touch input moving from the third linear sensor array 106 to the first linear sensor array 102, i.e. in the opposite direction, may cause the object to be rotated in a clockwise direction about the same axis.

Figure 6E:
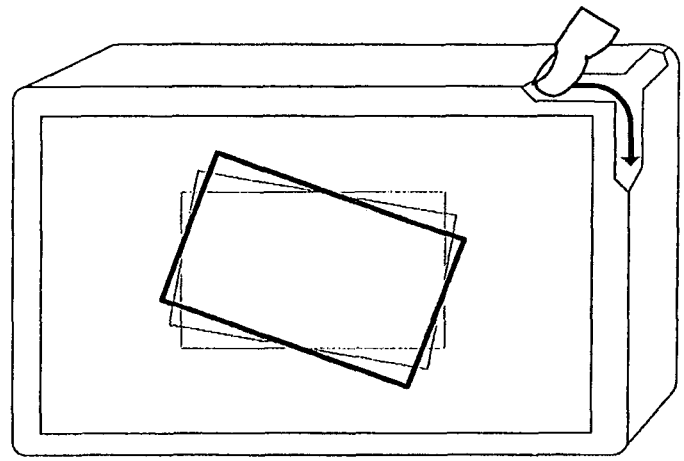

In FIG. 6E, a dynamic touch input moving from the first linear sensor array 102 to the second linear sensor array 104 is applied to the sensor arrangement 100. This causes the object 602 to be rotated clockwise about an axis parallel to the longitudinal length of the third linear sensor array 106, which is perpendicular to the surface of the display screen 504. It will be appreciated that provision of a dynamic touch input moving from the second linear sensor array 104 to the first linear sensor array 102 may cause the object to be rotated in an anticlockwise direction about the same axis.

Figure 6F:
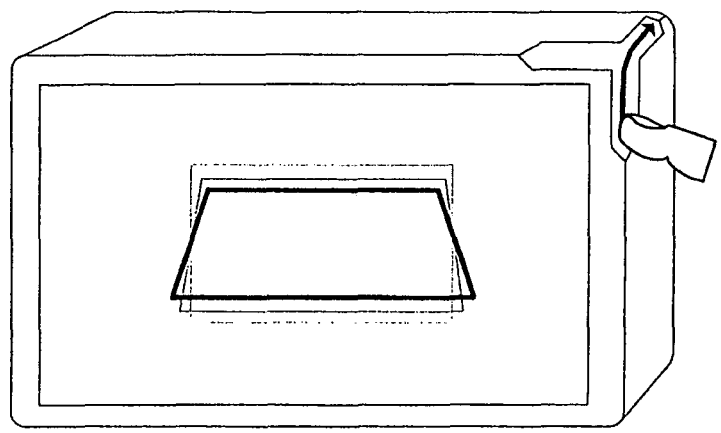

In FIG. 6F, a dynamic touch input moving from the second linear sensor array 104 to the third linear sensor array 106 is applied to the sensor arrangement 100. This causes the object 602 to be rotated clockwise about an axis parallel to the longitudinal length of the first linear sensor array 102, which his parallel to the length of the display screen 504. It will be appreciated that provision of a dynamic touch input moving from the third linear sensor array 106 to the second linear sensor array 104 may cause the object to be rotated in an anticlockwise direction about the same axis.

FIGS. 6A to 6F show how the input device 10 may be used to simulate to a user the ability to control an object displayed on a display screen with six degrees of freedom. Six degrees of freedom (6 DoF) refers to motion of a body in three-dimensional space, namely the ability to move forward/backward, up/down, left/right (i.e. translation in three perpendicular axes) combined with rotation about three perpendicular axes (i.e. roll, yaw, pitch). Furthermore, the gestures required to cause the required motion, reflect the motion of the object. As such, a user may feel an improved causal connection between the gesture they make and the action of the object on the display screen.

Figure 6G:
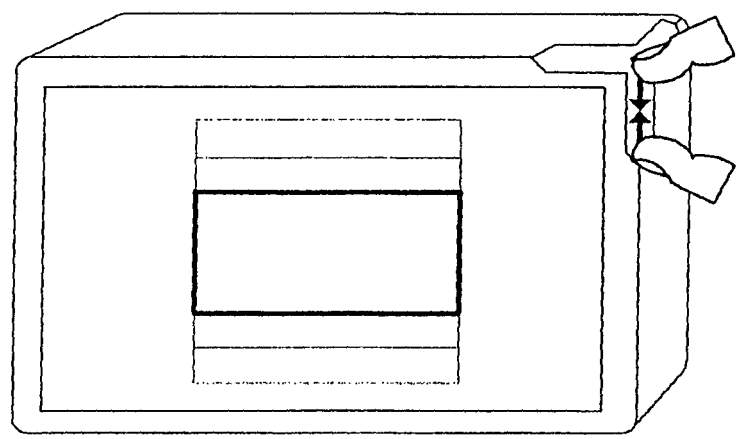

In FIG. 6G a gesture of the sixth gesture type is provided to the second linear sensor array 104. In this case, the gesture is a pinching motion. This causes the object on the screen to be scaled down in only one dimension. The one dimension in this case is parallel to the second linear sensor array 104. The action of reducing the distance between the user's finger and thumb causes the size of the object in only one dimension to be reduced. It will be appreciated that a gesture in which the distance between a user's finger and thumb is increased may cause the size of the object in one dimension to be increased. It will also be understood that provision of the sixth gesture type to the first linear sensor array 102 may cause the scaling up or scaling down of the object 602 in the dimension parallel to the first linear sensor array 102.

The other gesture types described above may also be used to control the appearance of the object 602 on the display.

The input device 10 is also configured to determine the speed and magnitude of the gestures provided to the sensor arrangement. The magnitude of a dynamic input may be determined by calculating the length of the sensor arrangement 100 along which a finger is moved during the dynamic input. This may involve a comparison of start and end locations. The speed of the dynamic input may be determined by dividing the above length by the time taken for the finger to travel that length, or it may be calculated in some other way.

It will be understood that the input device 100 is of particular use for manipulating three dimensional images displayed on the display screen. However, it will be appreciated also that the input device is useful in any application in which objects or images may be moved around, or manipulated on, the display screen. Such applications include, but are not limited to, internet browsers, navigation applications, such as routing and mapping software (GPS- or non-GPS-based), computer games and photo-viewers. Instead of moving an object on the display, the input device 10 may be used to control a viewpoint. For instance, controlling the display to show the view through a camera viewfinder, the input device 10 may control the location and orientation of the camera in its environment. Different gestures may result in movement of the camera within the environment, control the orientation, and/or control the zoom level. Such may be particularly useful in gaming applications.

The input device may also be used to control other applications such as music players. For example, the first gesture type may be used to change songs, the seventh gesture type may be used to change the volume, and the fourth gesture type may be used to fast forward or rewind through songs.

In the above Figures, the electronic device 50 is shown to incorporate one sensor arrangement 100. According to some example embodiments of the invention, the electronic device 50 may instead include two or more sensor arrangements 100. For example, the electronic device 50 may include two sensor arrangements 100, one disposed at either side of the display screen 504, or four sensor arrangements 100, one disposed substantially at each corner of the display screen 504. Such embodiments may facilitate improved game playing as the user can use both hands to control the game, and thus has a greater range of different inputs at their disposal. Also, in alternative example embodiments, the sensor arrangement 100 or arrangements may be located towards the rear of the electronic device 50 away from the display screen 504. In such embodiments, the convergence region or regions 110 may be located substantially at an upper vertex or vertices of the rear surface of the device 50.

It should be realised that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

What is claimed is:

1. An apparatus, comprising:
one or more processors; and
one or more memories including computer program code, the one or more memories and the computer program code configured to, with the one or more processors, cause the apparatus to perform at least the following:
detect inputs on a sensor arrangement, the sensor arrangement comprising first, second and third linear sensor arrays, each of the linear sensor arrays being disposed generally orthogonal to each of the other linear sensor arrays and converging with each of the other linear sensor arrays at or near one end thereof, wherein the first, second and third linear sensor arrays each detect input corresponding to a respective axis in three dimensional space, wherein the sensor arrangement includes the first linear sensor array disposed along a length portion of a first edge of a housing of a mobile communication device, the first edge being along a length of the housing and the length portion starting at a corner of the housing and extending along a part of the length, the second linear sensor array disposed along a width portion of a second edge of the housing, the second edge being along a width of the housing and the width portion starting at the corner of the housing and extending along a part of the width, and the third linear sensor array disposed along a depth portion of a third edge of the housing, the third edge being along a depth of the housing and the depth portion starting at the corner of the housing, and wherein the depth is shorter than the length and the width and the ratio of the depth portion to the depth is greater than the ratio of the length portion to the length and is greater than the ratio of the width portion to the width, and wherein a respective end of each linear sensor array is disposed at the corner of the housing where the first, second and third linear sensor arrays intersect;
provide a first output in response to determining that two consecutive inputs are on different ones of the first and second linear sensor arrays;
provide a second output in response to determining that two consecutive inputs are on different ones of the second and third sensor arrays; and
provide a third output in response to determining that two consecutive inputs are on different ones of the first and third linear sensor arrays.

2. The apparatus of claim 1, wherein the first output is dependent on an order of a sequence of the consecutive inputs on the different ones of the first and second linear sensor arrays, the second output is dependent on an order of a sequence of the consecutive inputs on the different ones of the second and third linear sensor arrays, and the third output is dependent on an order of a sequence of the consecutive inputs on the different ones of the first and third linear sensor arrays.

3. The apparatus of claim 1, wherein the at least one processor is further configured under the control of software to provide a fourth output in response to determining that at least two consecutive inputs of a discrete sequence of consecutive inputs on one of the linear sensor arrays are on different locations.

4. The apparatus of claim 3, wherein the fourth output is dependent on an order of a sequence of the at least two consecutive inputs on the different locations.

5. The apparatus of claim 1, wherein the at least one processor is further configured under the control of software to provide a fifth output in response to determining there to be a difference in separation between first and second inputs on one of the linear sensor arrays between first and second consecutive pairs of simultaneous inputs.

6. The apparatus of any claim 1 wherein the at least one processor is configured to execute an application, wherein the application is configured to be controlled by the outputs.

7. The apparatus of claim 1 further comprising a display, wherein the at least one processor is configured to cause an image displayed on the display to be manipulated based on the outputs.

8. The apparatus of claim 1, further comprising a display configured to display an image, wherein the at least one processor is configured under the control of software:
to rotate an image displayed by the display about a first axis in response to provision of the first output;
to rotate an image displayed by the display about a second axis in response to provision of the second output; and
to rotate an image displayed by the display about a third axis in response to provision of the third output.

9. The apparatus of claim 1, wherein the apparatus is a portable electronic device.

10. A method comprising:
detecting inputs on a sensor arrangement, the sensor arrangement comprising first, second and third linear sensor arrays, each of the linear sensor arrays being disposed generally orthogonal to each of the other linear sensor arrays and converging with each of the other linear sensor arrays at or near one end thereof, wherein the first, second and third linear sensor arrays each detect input corresponding to a respective axis in three dimensional space, wherein the sensor arrangement includes the first linear sensor array disposed along a length portion of a first edge of a housing of a mobile communication device, the first edge being along a length of the housing and the length portion starting at a corner of the housing and extending along a part of the length, the second linear sensor array disposed along a width portion of a second edge of the housing, the second edge being along a width of the housing and the width portion starting at the corner of the housing and extending along a part of the width, and the third linear sensor array disposed along a depth portion of a third edge of the housing, the third edge being along a depth of the housing and the depth portion starting at the corner of the housing, and wherein the depth is shorter than the length and the width and the ratio of the depth portion to the depth is greater than the ratio of the length portion to length and is greater than the ratio of the width portion to the width, and wherein a respective end of each linear sensor array is disposed at the corner of the housing where the first, second and third linear sensor arrays intersect;
in response to determining that two consecutive inputs are on different ones of the first and second linear sensor arrays, providing a first output;
in response to determining that two consecutive inputs are on different ones of the second and third sensor arrays, providing a second output; and
in response to determining that two consecutive inputs are on different ones of the first and third linear sensor arrays, providing a third output.

11. The method of claim 10, further comprising providing a fourth output in response to determining that at least two consecutive inputs of a discrete sequence of consecutive inputs on one of the linear sensor arrays are on different locations.

12. The method of claim 10, further comprising providing a fifth output in response to determining there to be a difference in separation between first and second inputs on one of the linear sensor arrays between first and second consecutive pairs of simultaneous inputs.

13. The method of claim 10, comprising:
displaying an image on a display;
in response to provision of the first output, rotating the image displayed on the display about a first axis;
in response to provision of the second output, rotating the image displayed on the display about a second axis, the second axis being substantially perpendicular to the first axis; and
in response to provision of the third output, rotating the image displayed on the display about a third axis, the third axis being substantially perpendicular to both the first and second axes.

14. The method of claim 13, further comprising:
in response to determining that at least two consecutive inputs of a discrete sequence of consecutive inputs on one of the linear sensor arrays are on different locations, translating the image displayed on the display an axis substantially parallel to the longitudinal axis of the one of the linear sensor arrays.

15. The method of claim 13, further comprising in response to determining there to be a difference in separation between inputs on one of the linear sensor arrays of between first and second consecutive pairs of simultaneous inputs, resizing the image in one dimension, the one dimension being substantially parallel to the longitudinal axis of the one of the linear sensor arrays.

16. An apparatus, comprising:
a display configured to display an image;
a sensor arrangement; and
a processing arrangement;
wherein the sensor arrangement comprises first, second and third linear sensor arrays, each of the linear sensor arrays being disposed generally orthogonal to each of the other linear sensor arrays and converging with each of the other linear sensor arrays at or near one end thereof, wherein the first, second and third linear sensor arrays each detect input corresponding to a respective axis in three dimensional space, wherein the sensor arrangement includes the first linear sensor array disposed along a length portion of a first edge of a housing of a mobile communication device, the first edge being along a length of the housing and the length portion starting at a corner of the housing and extending along a part of the length, the second linear sensor array disposed along a width portion of a second edge of the housing, the second edge being along a width of the housing and the width portion starting at the corner of the housing and extending along a part of the width, and the third linear sensor array disposed along a depth portion of a third edge of the housing, the third edge being along a depth of the housing and the depth portion starting at the corner of the housing, and wherein the depth is shorter than the length and the width and the ratio of the depth portion to the depth is greater than the ratio of the length portion to the length and is greater than the ratio of the width portion to the width, and wherein a respective end of each linear sensor array is disposed at the corner of the housing where the first, second and third linear sensor arrays intersect; and
wherein the processing arrangement is configured under the control of software:
in response to determining that two consecutive inputs are on different ones of the first and second linear sensor arrays, to rotate the image displayed on the display about a first axis;
in response to determining that two consecutive inputs are on different ones of the second and third sensor arrays, to rotate the image displayed on the display about a second axis, the second axis being substantially perpendicular to the first axis; and in response to determining that two consecutive inputs are on different ones of the first and third linear sensor arrays, to rotate the image displayed on the display about a third axis, the third axis being substantially perpendicular to both the first and second axes.

\* \* \* \* \*